Oct. 16, 1956  L. W. KELSAY  2,766,713
TORPEDO-STEERING CONTROL SYSTEM
Filed March 11, 1949  3 Sheets-Sheet 1

INVENTOR
L.W. KELSAY
BY
ATTORNEY

Oct. 16, 1956     L. W. KELSAY     2,766,713

TORPEDO-STEERING CONTROL SYSTEM

Filed March 11, 1949     3 Sheets-Sheet 2

INVENTOR
L.W. KELSAY
BY

ATTORNEY

Oct. 16, 1956      L. W. KELSAY      2,766,713

TORPEDO-STEERING CONTROL SYSTEM

Filed March 11, 1949      3 Sheets-Sheet 3

INVENTOR
L. W. KELSAY
BY
ATTORNEY

United States Patent Office 2,766,713
Patented Oct. 16, 1956

2,766,713

TORPEDO-STEERING CONTROL SYSTEM

Leroy W. Kelsay, West Point Pleasant, N. J., assignor to Bell Telephone Laboratories, Incorporated, New York, N. Y., a corporation of New York Application March 11, 1949, Serial No. 80,979

5 Claims. (Cl. 114—23)

This invention relates to control systems and more particularly to torpedo-steering systems in which the rudder is automatically controlled to steer the torpedo along a preset course in the horizontal dimension for a period following the launching and subsequently is signal controlled by underwater signals, received from a target, for changing the course and directing the torpedo to the target for the hit.

In such dual-steering systems it is desirable from the standpoint of effective range and accuracy of attack, that the automatic transfer of the rudder from course maintaining control to target signal control be accomplished as soon as the torpedo enters the effective signal field of the target, that is to say, when the torpedo reaches a distance from the target at which the target signal responsive portion of the steering system is capable of steering the torpedo in accordance with the signals originating at the target or reflected thereby.

The horizontal course is usually controlled by a gyroscope. The target signal responsive equipment for the rudder may include two hydrophones, mounted on opposite sides of the torpedo body and connected in an electric circuit for impressing current impulses corresponding to the received underwater signals upon a translating system for operation of the rudder.

An object of the invention is to improve torpedo-steering systems of the dual type, mentioned above, and more particularly to increase the accuracy of attack by torpedoes controlled by such steering systems.

In the standard rudder-control arrangements, the pallet or control arm of the gyroscope is connected mechanically directly to the steering valve which controls the rudder engine. The pallet arm operates into either of two extreme positions, and thereby operates the steering valve into either of two control positions. The rudder engine also is connected mechanically directly to the rudder lever, and the steering valve, in admitting power to the engine in reverse senses, causes the rudder to be thrown hard to starboard or to port, as dictated by the gyroscope.

In this mechanical arrangement it has been found possible to reduce to within acceptable limits the hunting action of the torpedo to either side of its course by adjustments within the gyroscope, as is well known, and by making the air passages as short as possible.

In steering systems of the dual type contemplated by the invention, where the steering vane is subject to both automatic course maintaining control and to target signal control, alternately or simultaneously, other arrangements have been proposed for the steering control connections which, however, have been found to cause excessive hunting by the torpedo due to delays inherent in those arrangements.

In one such arrangement for rudder control, the steering valve is connected through a spring to the pallet arm of the gyroscope, which operates in the same manner as the standard connection referred to above, except that the action is delayed by storing of operating energy in the spring. However, the purpose of the spring is to permit the steering valve to be operated to either side also by the signal operated control mechanism independently of the position of the pallet arm.

Various electric connections and systems have also been proposed for rudder control not only by the target signal equipment but also by the gyroscope. In certain of these, the rudder engine and its steering valve have been replaced by electric operating means for the rudder, such as solenoids or a reversible electrical motor. With such electric operating means, the two types of controls, gyroscope and target signal, may readily be separated or combined for any desired mode of control of the rudder by means of suitable circuit arrangements. It has been possible in these arrangements to reduce the delay, referred to above, to within reasonable limits, so that the hunting action caused thereby may be taken into account by the system and accuracy of attack will not be seriously sacrificed.

It is a principal object of the invention to take advantage of the quick operating feature and positive action of the mechanical system of rudder operation, referred to above, in a torpedo-steering system which combines gyroscope control and target signal control, in a manner to insure high accuracy of attack by the torpedo.

It is a more specific object to introduce mechanical rudder operating features also into the target signal responsive equipment.

In accordance with a general feature of the invention, the target signal control equipment is arranged to operate a valve mechanism in response to the received target signals, and through that valve mechanism to operate a rudder engine for setting of the rudder in starboard or port.

In accordance with a further feature of the invention, the gyroscope control equipment and the signal control equipment are mechanically coordinated for proper cooperation in the desired mode of steering without undesirable delay.

In a specific embodiment of the invention, the rudder in a dual-steering system is operated directly by a rudder engine having a two-position steering valve or shutter for admitting a pressure medium, such as air or any other suitable gas or vapor, to one or the other side of the engine piston for setting the rudder in starboard or port positions. The engine is rigidly connected to the rudder lever and the valve is rigidly connected or linked to the pallet arm of the gyroscope.

The target signal responsive equipment includes a valve mechanism or shutter which, similar to the steering valve, can be operated into two steering positions for admitting the pressure medium to one or the other side of the engine piston for setting of the rudder. This signal valve may be operated by any suitable electric operating means, such as a pair of oppositely operating solenoids, in response to the incoming target signals of different directional characteristics. The signal valve is, however, so constructed that when it is operated into either one of its steering positions, and only then, it renders the steering valve ineffective, and thus excludes the gyroscope control from the rudder engine and the rudder at such time.

For this purpose, the target signal controlled valve mechanism is inserted at a suitable point in the pressure system leading from the pressure tank, through the steering valve to the rudder engine.

The signal valve is connected mechanically directly to the electric operating means in the target responsive equipment so that the response of the rudder thereto may be made as quick as the response to the gyroscope.

Quickness of rudder response is further insured by arranging the inoperated or neutral position of the valve intermediate the two operated positions, thereby reducing the travel to a minimum in response to signals of either characteristic.

In a known type of rudder engine, the piston bore and the steering valve bore are arranged in parallel relation in a single engine block, which also has two smaller bores between piston and steering valve for passing of the pressure air between them.

In accordance with a more specific feature of the invention, the signal valve mechanism is composed of two valve bodies, operated in unison by suitable mechanical means, which may be located outside the engine block. The two valve bodies are sunk into the engine block across the two small bores, so that the main control passages will not be lengthened for this additional engine control. Additional bores of very short length are provided for exhaust air. Due to these short air passages, each engine control may be as quick acting in the dual system, as the single gyroscope control in the previous arrangement.

With the dual mechanical control feature of the invention different modes of torpedo control may be attained. For example, with a suitable timing arrangement, known as an enabler, the target signal equipment may be held inoperative until the torpedo has passed a predetermined distance from the launching point.

The target signal equipment may be designed in different ways. Thus this equipment may cut in for control of the rudder when a target field is reached in which the signal intensity is higher than a predetermined minimum.

The target signal equipment may furthermore be arranged or adjusted to be ineffective for steering in response to signals of intensity commensurate with the torpedo self-noise.

The target signal equipment may furthermore be arranged to cooperate with the gyroscope in steering the torpedo upon entering the effective target field. Thus the signal equipment may temporarily direct the torpedo toward the target and away from the gyroscope course and upon securing a straight aim may remain inactive and thereby again admit the gyroscope control to the rudder engine. After the gyroscope has diverted the torpedo from the aim, the signal equipment will again take over the rudder control.

In the following description, reference will be made to the accompanying drawing in which.

Figure 1:
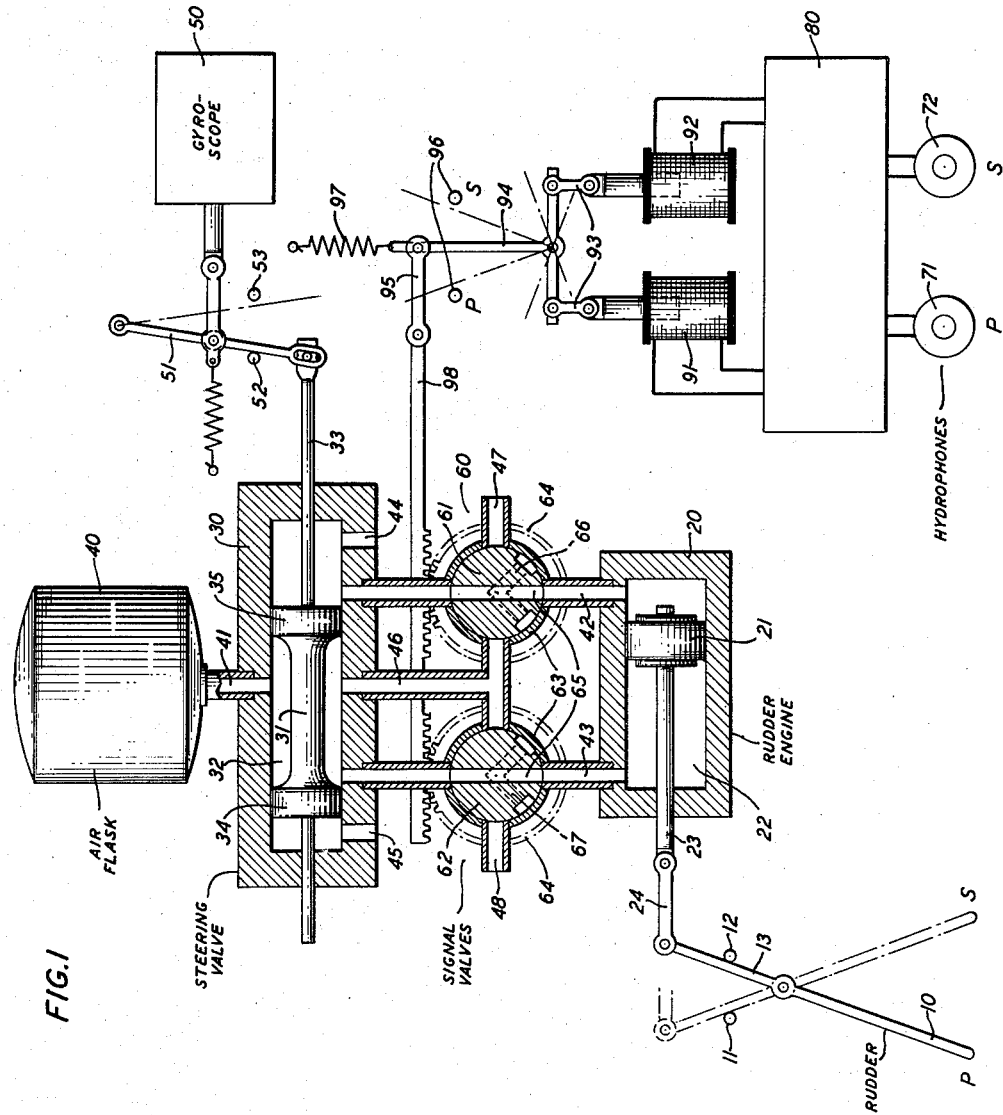
Fig. 1 is a schematic layout of a rudder steering system showing the mechanical equipment in a somewhat exploded form, for the sake of clearness, and indicating the gyroscope and signal control equipment by simple blocks.

The vertical rudder 10 for steering in the horizontal dimension is mounted to be swung into either extreme position determined by the fixed stops 11 and 12, namely the starboard and port positions.

The rudder engine 20 has a piston 21 which slides in the cylinder 22. The piston rod 23 is connected to the rudder lever 13 through a suitable rigid translating linkage 24. The piston 21 is packed to fit substantially air-tight with the cylinder wall, so that it may slide with relative ease from one end of the cylinder to the other in response to pressure by a pressure medium, such as air, admitted to either side of the piston.

The steering valve 30 has a valve member 31 which can slide lengthwise in the cylinder 32 under force applied to the valve rod 33. The valve member has two snug-fitting shoulders 34 and 35 which divide the cylinder space into three portions for passage of pressure air and exhaust air along different sets of circuits or passages depending upon the position of the valve member.

The gyroscope 50 and its pallet arm 51 are shown only schematically, since this device may be of known construction. The pallet arm 51 is operated into either of two extreme positions, as determined by the fixed stops 52 and 53, and in response to departure in either direction of the torpedo from its preset average course beyond a predetermined angle. This automatic operation may take place occasionally or periodically, as desired under any particular circumstances, and as is known in the art. The pallet arm is linked in any suitable manner to the valve rod 33 for operating the valve member 31 into its two control positions.

An air flask 40 contains air, or any other suitable gas, under pressure. The pressure is sufficient for quick operation of the rudder, through the rudder engine, against the water pressure at full speed of the torpedo. An air passage 41 connects the flask to the cylinder of the steering valve 30, which in turn is connected through two diverting air passages 42 and 43 to the opposite ends of the cylinder of the rudder engine 20.

The operation of the rudder under gyroscope control is as follows: With the various parts in position, as shown in Fig. 1, air passes from the flask through tube 41, through the middle space of the valve cylinder between shoulders 34 and 35, through the passage 43 into the left space in the rudder engine, thereby forcing or holding the piston 21 toward the right and causing the rudder to be set in its port position. The right-hand end of cylinder 22 is connected through passage 42 and right-hand space of valve cylinder 32 to the exhaust passage 44.

When in response to this rudder action the torpedo veers too far to port from its predetermined course the gyroscope will respond by operating its pallet arm over against the stop 53, thereby sliding the valve member 31 toward the right-hand end of the valve. In this position air enters through tube 41 into the middle portion of the valve as before, but now leaves through the passage 42 and passes into the right-hand end of the rudder engine, thereby forcing the piston to the left and operating the rudder hard to starboard. The left end of cylinder 22 is connected through passage 43 and left-hand space of the valve cylinder 32 to the exhaust passage 45.

When thereafter, the torpedo veers too far to starboard the gyroscope responds by operating the pallet arm back against the stop 52 thereby returning the steering valve 30, the rudder engine 20 and the rudder 10 to the port positions, as shown in the drawing.

Thus under gyroscope control the torpedo will be continuously hunting between two courses deviating to opposite sides from the preset average course. The period of hunting and therefore the angle of deviation depends largely upon the physical parameters of the torpedo and the quickness of operation of the rudder and its control system.

The mechanical gyroscope control system and operation, described so far, correspond in their essentials substantially to the standard rudder control referred to hereinbefore, the hunting action of which has been found to be adjustable within certain limits.

Referring now to the target signal responsive equipment for control of the rudder after the torpedo enters the effective target signal field, this equipment includes mainly a pair of hydrophones 71 and 72 connected through a suitable electric circuit 80 to a pair of solenoids 91 and 92 for operating a double signal valve 60 into either of two positions for control of the rudder engine 20.

The hydrophone circuit 80 may be arranged in any suitable known manner for translation of underwater signals, received by the hydrophones 71 and 72, into operation of the solenoids 91 and 92, in accordance with any desired mode or type of rudder control, such as those referred to above.

The two hydrophones for the rudder control are mounted symmetrically on opposite sides of the torpedo head and on the same level, so that they may differentiate between underwater signals or vibrations arriving from either side of the torpedo body. Thus the two hydrophones in combination produce electric signals of amplitude determined by the angle of arrival of the underwater signals, and indicative of the bearing of the target relative to the torpedo.

Figure 2:
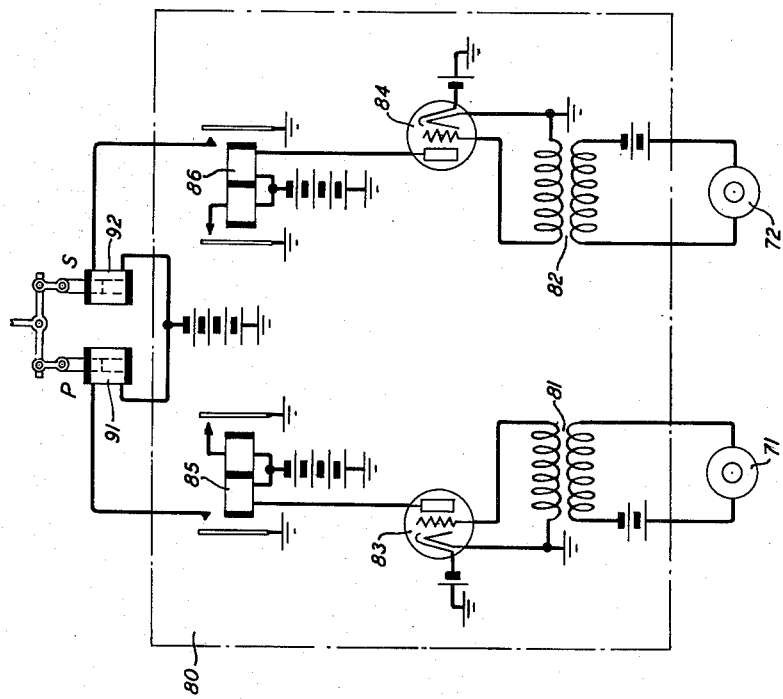
Fig. 2 is a circuit diagram of a signal control system for effecting a simple mode of torpedo steering by the mechanical equipment shown in Fig. 1.
Figure 6:
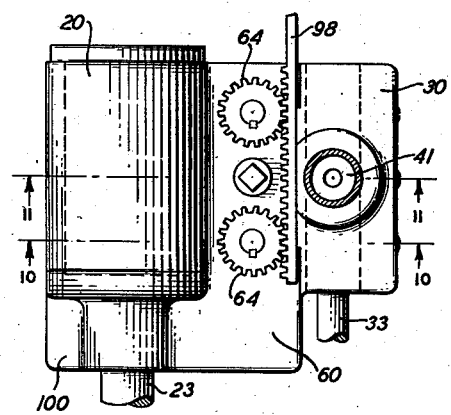
Figs. 6 to 11 are detail views of a preferred mechanical arrangement of the signal control valves in one type of rudder engine.
Figure 9:
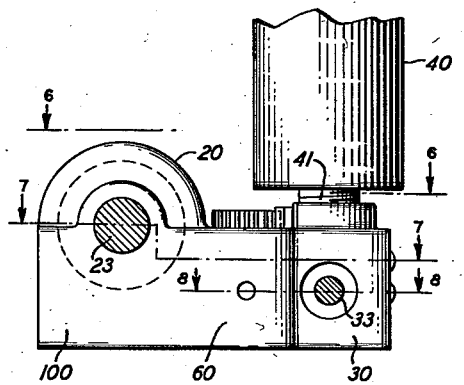
Figure 7:
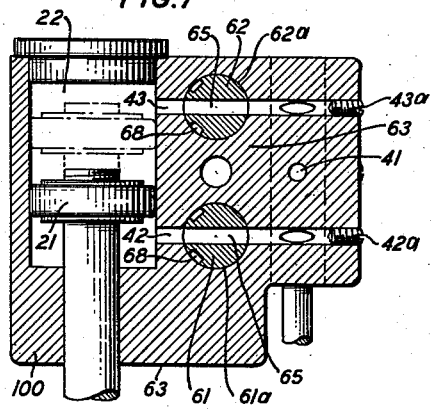
Figure 10:
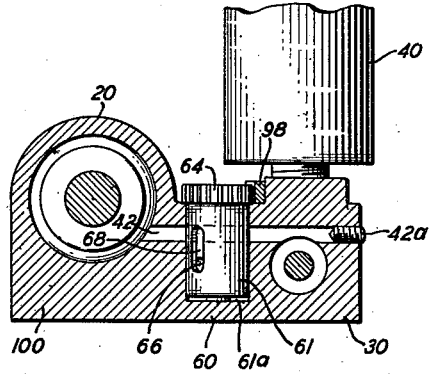
Figure 8:
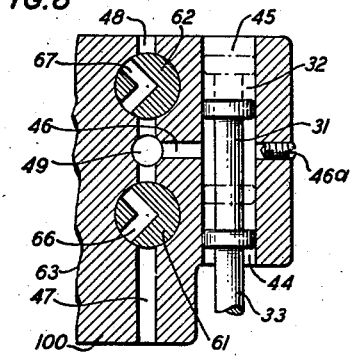
Figure 11:
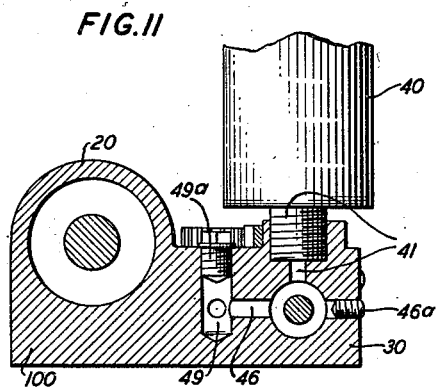

A simple circuit arrangment suitable for this purpose is shown, as an example, in Fig. 2. In this circuit, signals produced by hydrophone 71 are impressed through transformer 81 upon the input side of amplifier 83, which in turn produces an output current to energize relay 85 for operation of solenoid 91.

The amplifier may be suitably biased to make relay 85 responsive only to signals of magnitude above a predetermined minimum. Relay 85 may lock itself up, once energized, thereby holding solenoid 91 operated.

The hydrophone 72 is similarly connected through transformer 82, amplifier 84 and relay 86 to solenoid 92 for similar operations.

The signal valves 60, operated by the solenoids 91 and 92 include two similar valve mechanisms inserted by suitable stationary air passages between the steering valve 30 and the rudder engine 20.

Figure 3:
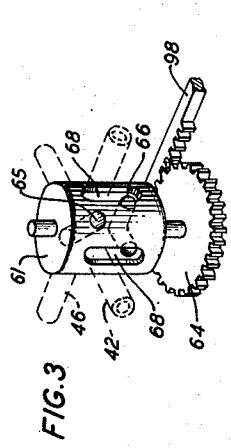
Fig. 3 is a perspective view of one of the valve bodies forming part of the signal valve.

Each valve includes a substantially cylindrical valve body 61 or 62, details of which are shown in perspective in Fig. 3. The valve body is completely encased in a housing 63 and suitably journaled in the housing for rotation about its axis. Externally of the valve housing proper is a suitable gear wheel 64 attached to the valve body and meshing with a tooth rack into or mounted on an operating bar 98, common to the two valves and connected through any conventional means, such as a rigid linkage 95, to the operating T lever 94, in turn connected through suitable linkages 93 to the magnet cores of the solenoids 91 and 92.

The lever system between the solenoids and the valve bodies is being held in neutral or unoperated position by suitable means, such as a spring 97 attached to the T lever 94, and is operable a fixed distance to either side by the corresponding solenoid, the distance being determined by the stops 96 for lever 94. These movements will cause the valve bodies to revolve through 45 degrees, more or less, to either side from their neutral position.

Each valve body has a straight passage 65 which, as shown in Fig. 1, in the neutral position of the valves completes the corresponding one of the two stationary air passages 42 and 43 between the steering valve and the rudder engine. Thus when the signal valves are in neutral position they admit air to the rudder engine under gyroscope control, in the manner already described. When the valve bodies are turned through 45 degrees to either side the passages 65 are disconnected from the air passages 42 and 43 and will be closed and made inactive by the walls of the valve housings 63.

Each valve body furthermore, has a by-path 66 or 67 which is offset from the plane in which the passage 65 is located and operated. Two depressions 68 in the surface of the valve body are arranged at 45 degrees from one of the openings of passage 65 and serve as air passages connecting the by-path 66 or 67 to the stationary air passages located in the plane of valve passage 65, whenever the valves are turned through 45 degrees to either side. In the neutral position, the by-paths 66 and 67 are closed and made inactive by the walls 63 of the valve housings.

It will now be assumed that the torpedo has traveled for some time along a predetermined course under gyroscope control in the manner already described and that it is approaching the effective target signal field. During this time, signals produced by either or both hydrophones will be passing through the circuit 80 but, due to the bias applied to the input of the amplifiers 83 and 84, the signals will be too weak to operate relay 85 or 86 and consequently solenoids 91 and 92 will remain unoperated. Under these conditions the solenoids 91 and 92 and the signal valves 60 remain in neutral position and do not affect the gyroscope control.

Figure 4:
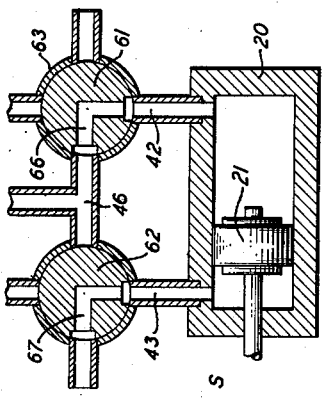
Figs. 4 and 5 are views of the signal valve pair in operated position for steering the torpedo to starboard and port, respectively.

Assuming that a target is off to starboard of the torpedo, the signals in the starboard side of the circuit 80 would reach operating strength as soon as the torpedo enters the effective signal area of the target. Consequently the starboard solenoid 92 would attract its core and operate the T lever 94 the full distance to the stop 96, thereby rotating the two valve bodies 61 and 62 through a 45-degree angle in a clockwise direction, to the position shown in Fig. 4.

In this position of the valve bodies 61 and 62, the passages 65 will be turned at 45 degrees and the air connections 42 and 43 will be disconnected from the steering valve 30. Thus continued operation of the gyroscope will have no effect upon the rudder.

However, another circuit may now be traced for the air supply to the rudder engine, namely from the flask 40 through passages 41 and 46, then valve passage 66 in valve 61, and through passage 42 into the rudder engine 20. The piston will be operated to the left and the rudder will be set in starboard. At the same time the exhaust will leave through passage 43 and valve passage 67 in valve 62 to the exterior through exhaust passage 48. Thus the torpedo will be steered toward starboard.

It may be noted here that the valve member 31 never closes the passages 41, 44, 45 and 46.

Figure 5:
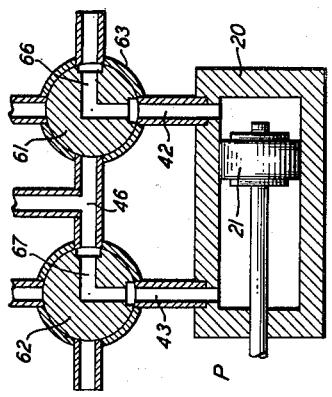

A target located off to port of the torpedo would similarly cause the operation of solenoid 91, which would result in the valve bodies 61 and 62 being rotated through 45 degrees in a counter-clockwise direction from the neutral position into their port position, shown in Fig. 5.

In the port position the valves 61 and 62 will still place the passages 65 out of alignment with the passages 42 and 43 and thus disable the gyroscope control. The valve passages 66 and 67 will, however, be placed as shown in Fig. 5, thereby admitting air from passage 46 through valve passage 67 into the rudder engine 20 for operating the piston and rudder to their port positions. At the same time the exhaust will leave through passages 42 and 66 to the exterior through exhaust passage 47. Thus the torpedo will be steered toward port.

It will thus be noted that the operation of the steering valve from one position to the other is substantially instantaneous, and that the operation of the signal valves from any one position to any other also is practically instantaneous. These operations thus have little or no consequential effect upon the hunting period, which is greatly dependent upon the delay in throwing the rudder over and therefore will be the same under either control.

The mechanical arrangement, shown in detail, in Figs. 6 to 11, of the rudder engine and valves, and shown more schematically in Figs. 1, 3, 4 and 5, is particularly adapted for permitting quick rudder operaion in response to either control.

In Figs. 6 to 11 parts corresponding to parts in Figs. 1, 3, 4 and 5 are correspondingly numbered.

The engine block 100 contains the rudder engine 20, the steering valve 30 and the signal valve 60. The engine block, which may be a solid metal casting, has a cylinder bore 22 for the piston 21. The block further has the valve bore 32 for the lengthwise travel of the double valve member 31 of the steering valve 30; the bore 32 is disposed in parallel relation to the bore 22. Between the two bores and interconnecting them are two smaller bores or passages 42 and 43, closed off from the exterior by means of screw plugs 42a and 43a. Another passage 41 leads from the middle of bore 32 into the air flask 40.

Thus air under pressure is applied by the flask 40 to the middle section of valve member 31, which in turn passes the air through passages 42 or 43 to one or the other side of the piston 21, depending on the position of valve member 31, which is connected to the gyroscope (not shown here). Exhaust air from cylinder 22 leaves through the passages 42 or 43 through the open ends 44 and 45 of bore 32. The piston rod 23 is connected for direct operation of the rudder (not shown).

The described arrangement of valve 30 and rudder engine 20 is substantially in accord with the standard control referred to hereinbefore.

In order to simplify the air connections for the dual control and to avoid lengthening them unnecessarily and also in order to keep the dimensions to a minimum for utilization of the available space, the signal valve 60 is composed of two separate valve bodies 61 and 62, one for each end of the cylinder 22, the bodies being inserted directly across the passages 42 and 43, respectively. The valve bodies 61 and 62 are substantially cylindrical and are sunk into cylindrical pits 61a and 62a drilled and carved into the solid metal of the engine block at points about midway of the passages 42 and 43, respectively.

As previously described, the valve bodies have through passages 65, which in neutral position establish the air passages 42 and 43 the full distance between the cylinders 22 and 32, as required for gyroscope control.

The engine block is now further provided with a bore 47, 48 passing through the pits 61a and 62a in a plane below that defined by the bores 42 and 43, and joined through a transverse pit 49 to a bore 46 passing through the middle of valve bore 32. The pit 49 and bore 46 are closed off from the exterior by screw plugs 49a and 46a.

For the purpose of interconnecting the bores in the two different planes, and as previously described, each of the valve bodies has a by-pass 66 or 67 and two depressions 68 in the surface of the valve body placed at 45 degrees on opposite sides of that end of the passage 65 which is nearest to the cylinder 22.

Thus when the valve bodies are turned through 45 degrees from their neutral position, one will pass air from passage 46, through passage 42 or 43 into the cylinder, and the other will pass exhaust air from the cylinder through passage 43 or 42 to the exterior, through passages 48 or 47, respectively. This action is unaffected by possible operations of valve 31.

The valve bodies are reciprocable in unison by means of their individual gear wheels 64 and the common tooth rack 98, which is operated by the hydrophone controlled solenoids 91 and 92 (not shown here).

What is claimed is:

1. In a dual-steering control system for directional guidance of a moving body, a course maintaining system responsive to course deviations by said body, a course changing system responsive to signals of different directional characteristics and intensity arriving at said body from a distant signal source, and steering means for said body; said steering means comprising a steering vane, a supply of fluid operating medium, and a two-position engine connected to operate said vane into two positions by said medium; said source maintaining system comprising a valve mechanism having passages connected between said medium supply and said engine for control of engine operations into said two positions, and a preset device responsive to course deviations by said body and connected to operate said valve mechanism in opposite directions for said control; and said course changing system comprising a three-position reciprocatory valve mechanism having first passages in a middle position being included in the before said passages and in either extreme position being excluded from the before said passages to discontinue the engine control by said course maintaining system, said three-position valve mechanism having second passages in one extreme position and third passages in the other extreme position connected between said medium supply and said engine for control of engine operations into one or the other of said two positions, respectively, and said course changing system further comprising signal differentiating means responsive to signals of two different characteristics and connected for corresponding operation of said three-position valve mechanism in opposite directions from said middle position into one or the other of said extreme positions.

2. A dual control system for the guidance of a torpedo comprising a gas reservoir, a two position steering vane, a reciprocating engine connected to said reservoir and in operable engagement with said vane, a plurality of control valves interposed between said reservoir and said engine, mechanical means, having a shaft directly coupled to one of said valves, for automatically regulating the gas supply to said engine for initially controlling the direction of the torpedo, electro-mechanical means connected to other of said valves for admitting gas to said engine to provide a second control for said torpedo, signal responsive means connected to and controlling the operation of said electro-mechanical means, said signal responsive means operable only when signals of at least a prescribed intensity are received to render the initial control inoperative by causing the second control to supersede said initial control and direct the course of the torpedo.

3. A dual control system for the guidance of a torpedo comprising a gas reservoir, a two position steering vane, a reciprocating engine connected to said reservoir and in operable engagement with said vane, a plurality of control valves interposed between said reservoir and said engine, mechanical means having a shaft directly coupled to one of said valves for automatically regulating the gas supply to said engine for initially controlling the direction of the torpedo, electro-mechanical means connected to other of said valves for admitting gas to said engine to provide a second control for said torpedo, a pair of signal responsive means connected to and controlling the operation of said electro-mechanical means, said signal responsive means operable only when signals of different directional characteristics and intensity, emanating from a single source, are received to render the initial control inoperative by causing the second control to supersede said initial control and take over the direction of the torpedo.

4. A dual torpedo steering system comprising a rudder, a compressed air motor coupled to said rudder for effecting deflection thereof in one direction or the other, a compressed air reservoir for said motor, means including valve means defining a first coupling between said reservoir and said motor, means including a second valve defining a second coupling between said reservoir and said motor, gyroscope controlled means for actuating said first valve means to control the direction of deflection of said rudder by said motor in accordance with the direction of deviation of the torpedo from a preassigned course, and means responsive to submarine signals for simultaneously disabling said first coupling and controlling said second valve means to control the direction of deflection of said rudder by said motor in accordance with the direction, relative to the torpedo, of the source of signals received by said submarine signal responsive means.

5. In a dual control system for the remote control of a missile, a gas reservoir, a two position primary control valve connected to said reservoir for directing the flow of gas therefrom, said valve having a mechanically controlled reciprocating member positioned in its central bore, said bore having a plurality of outlet ports, one group communicating with the atmosphere and a second group connected to a pair of rotary valves, one port to each valve, and one port common to both valves, said rotary valves simultaneously operated by electro-mechanical means, responsive to signals of a prescribed intensity, impinged upon signal responsive means connected to said electro-mechanical means, said rotary valves each having inlet and outlet ports, certain of said outlet ports connected to an engine for controlling a steering vane on said missile and the others communicating with the atmosphere, said rotary valves arranged to be rotated clockwise or counter-clockwise to cause passages in said valves to align with certain of said exhaust ports to cause a piston in said engine to reciprocate to actuate said steering vane.

References Cited in the file of this patent

UNITED STATES PATENTS

| | | |
|---|---|---|
| 1,121,563 | Leon | Dec. 15, 1914 |
| 1,418,791 | Hammond | June 6, 1922 |
| 2,238,300 | Zand et al. | Apr. 15, 1941 |
| 2,391,629 | Keller | Dec. 25, 1945 |